United States Patent [19]

Porter et al.

[11] 3,973,890
[45] Aug. 10, 1976

[54] ADJUSTABLE DIE FACE PELLETIZER

[75] Inventors: Carter E. Porter, Cranford, N.J.; Richmond S. Parsons, Warminster; Paul H. Rossiter, Paoli, both of Pa.

[73] Assignee: Exxon Research and Engineering Company, Linden, N.J.

[22] Filed: Feb. 26, 1975

[21] Appl. No.: 553,296

Related U.S. Application Data

[63] Continuation of Ser. No. 364,977, May 29, 1973, abandoned.

[52] U.S. Cl. .............................. 425/144; 241/82.2; 241/82.7; 241/89.1; 425/311; 425/466; 425/376
[51] Int. Cl.² ...................... B29F 3/08; B29F 3/06
[58] Field of Search ........... 425/311, 312, 313, 310, 425/316, 331, 376, 466, 324 R, 381, 378 R, 144, 146; 241/82.2, 82.7, 88, 89.1

[56] References Cited
UNITED STATES PATENTS

| | | | |
|---|---|---|---|
| 2,162,647 | 6/1939 | Sizer | 425/311 |
| 2,252,900 | 8/1941 | Shafer | 425/311 |
| 3,316,590 | 5/1967 | Rettig | 425/310 X |
| 3,685,376 | 8/1972 | Levine et al. | 83/355 X |

FOREIGN PATENTS OR APPLICATIONS

| | | | |
|---|---|---|---|
| 783,451 | 5/1972 | Belgium | 425/311 |

Primary Examiner—Robert L. Spicer, Jr.

[57] ABSTRACT

The cutter used with a cylindrically shaped die plate means on a thermoplastic extruder is rotatable about the axis of the die plate and has a plurality of radially projecting blades that extend longitudinally and sweep across the downstream face of the die plate means as the cutter rotates severing extruded heat-plastified material into pellets. The blades form continuous longitudinal channels within which the pellets collect as the cutter rotates. The cutter is enclosed to permit pellet treatment fluid to flow longitudinally over the cutter and flush the pellets from the channels as soon as the pellets are severed. The die plate means comprises a pair of nested die plates mounted for selective positioning relative to one another. In one relative position, the orifices in the plates are essentially aligned to offer minimum constriction to the extrusion of heat-plastified material through the orifices. Adjusting means is provided to selectively change the relative position of the die plates to maintain a substantially constant pressure of heat-plastified material upstream of the die plate means.

9 Claims, 7 Drawing Figures

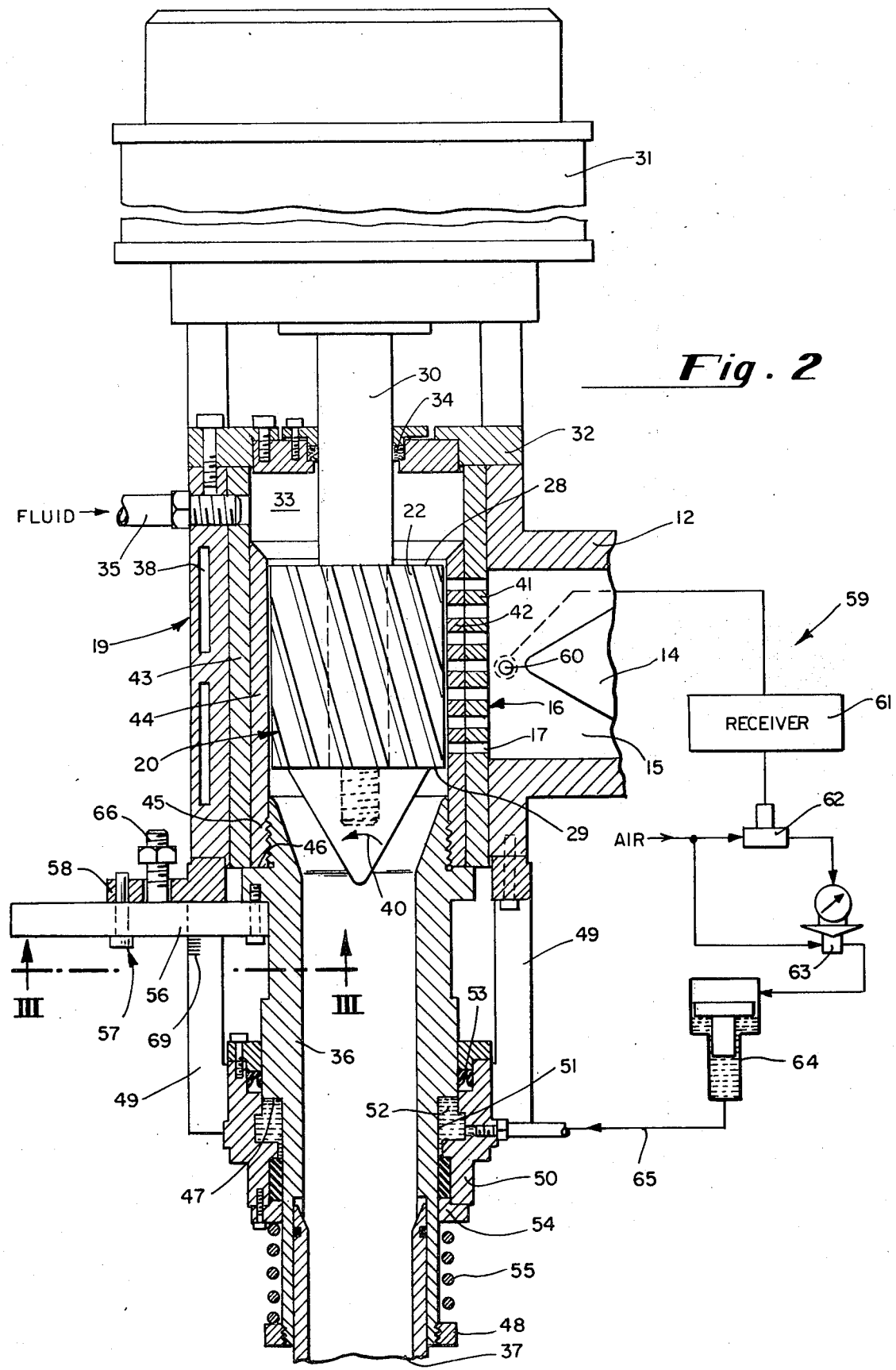

ADJUSTABLE DIE FACE PELLETIZER

This is a continuation of application Ser. No. 364,977, filed May 29, 1973, now abandoned.

BACKGROUND OF THE INVENTION

This invention is directed to the adjustment as it relates to face-cutting apparatus for making and treating pellets of thermoplastic material.

Face-cutting apparatus of the type described is disclosed in U.S. Pat. No. 3,316,590. In such apparatus, the die plate means associated with a thermoplastic extruder device is cylindrically shaped and is provided with radially extending extrusion orifices through which heat-plastified material is extruded by reason of the operation of a rotating feed-screw which pressurizes the material upstream of the die plate means. The blade of a single-lead cutter has a cutting edge which is operatively associated with the downstream face of the die plate means, and which shears heat-plastified material extruded through the orifices into pellets. The cutter is enclosed to establish a chamber receiving circulating liquid or gaseous coolant which serves to improve the cutting-efficiency and to collect the pellets as they are formed.

The pellet thickness achieved with apparatus of the type described depends upon the rate of rotation of the cutter and the rate at which the plastic material is extruded. If the cutter speed is essentially constant, variations in pellet thickness can be attributed to changes in the rate of extrusion. Such rate is determined in large part by the viscosity of the thermoplastic material just upstream of the die plate means. As the viscosity increases, due to upstream temperature reduction, for example, less material is extruded per unit time, and the resultant pellets will be thinner than when the viscosity decreases. In many processes, variations in pellet thickness is not important. In processes where uniformity is necessary because of size considerations or because of a need to remove a uniform percentage of volatiles from all of the pellets, apparatus heretofore available has not proved to be successful. The primary object of the present invention, therefore is to provide face-cutting apparatus which can effect the high speed production of uniform pellets.

BRIEF SUMMARY OF THE INVENTION

Briefly, the invention involves, in the combination, the arrangement and operation of the die plate means for use in effecting slight and infinitely variable orifice adjustments in conjunction with a particular cutter and in conjunction with other apparatus. The apparatus and functions taught herein, separate and apart from their adaptation and use for effecting these orifice adjustments by slight misalignments of holes in plates, do not comprise the invention of this application.

As to the cutter, it has a plurality of blades projecting radially from a cylindrical body and extending longitudinally therealong. At the free end of each blade is a cutting edge that is operatively associated with the downstream side of the die plate means, so that upon rotation of the cutter, heat-plastified material extruded through the orifices of the die plate means is sheared into pellets. Adjacent pairs of blades on the cutter and the intervening body portion establish continuous longitudinally extending channels into which the newly sheared pellets collect.

Where the blades are helically arranged on the body of the cutter, rotation of the cutter in one direction causes the blades to appear to advance in one axial direction. By supplying pellet-treatment fluid to a chamber enclosing the cutter and causing such fluid to flow in the one axial direction, pellets are sheared sequentially in this direction along longitudinal lines of the die plate means permitting the treatment fluid to flush through the channels formed by the cutter and the die plate means, and to sweep each pellet from the cutting edge of a blade as the pellet is severed. The pellets can be collected at the downstream end of the cutter. This arrangement prevents pellets from accumulating in the channels and interfering with the cutter operation, and at the same time achieves the desired volatilization of the material of the pellets. The cutter, its arrangement, the blades, and the orientation of the unit as well as the manner of flushing with treatment fluid, and even the broad idea of effecting relative movements between relatively rotatable cylindrical die plates do not, per se, comprise features of this invention.

The die plate means comprises a pair of nested die plates mounted for slight selective positioning for altering or adjusting the degree of alignment or misalignment of orifices of the plates relative to one another and comprises the essence of this invention. In one relative position, the orifices in the plates are essentially aligned to offer minimum resistance to the extrusion of heat-plastified material through the orifices. By changing the relative position of the two die plates, the resultant misalignment of the orifices introduces a construction at the interface between the plates to the extrusion of material. Selective changes to the relative position of the plates in response to changes in the pressure of the heat-plastified material upstream of the die plates will maintain a substantially constant rate of extrusion. Because the flow construction occurs at the interface between the die plates, the cross-section of the material at the downstream face of the die plate closer to the cutter will be constant; and because the rate of extrusion can be kept constant, the thickness of the pellets will be uniform. Thus, the physical size of the pellets is closely controlled.

The more important features of the apparatus have thus been outlined rather broadly in order that the detailed description thereof that follows may be better understood, and in order that the contributor to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be sufficient breadth to prevent the appropriation of this invention by those skilled in the art.

BRIEF DESCRIPTION OF VIEWS OF THE DRAWING

For a more complete understanding of the nature and objects of the invention, reference should be had to the following detailed description taken in connection with the accompanying drawings wherein:

FIG. 2 is a section of the apparatus shown in FIG. 1 taken along the line II—II of FIG. 1;

DETAILED DESCRIPTION

Figure 1:
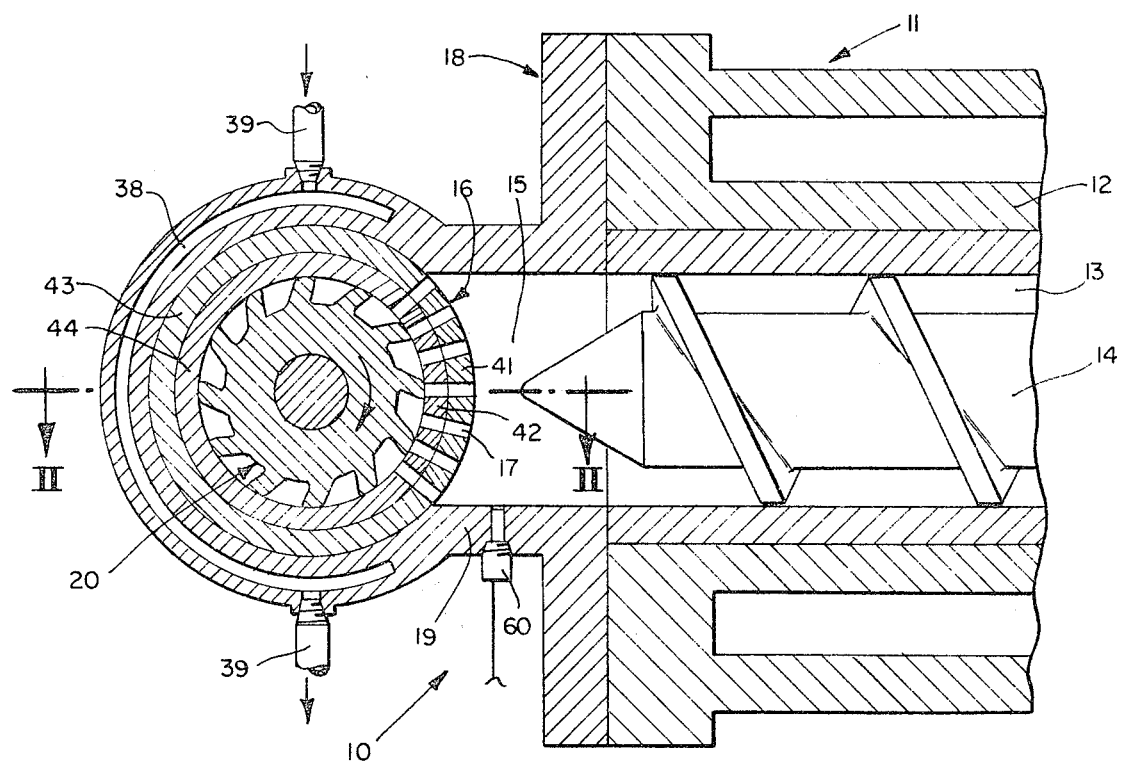
FIG. 1 is a sectional view of face-cutting apparatus showing details of the cutter means and die plate means.

Referring now to FIG. 1, the face cutting apparatus is designated generally by reference numeral 10, and is associated with an extrusion device 11 comprising an extrusion chamber 12 having a mixing or kneading bore 13 within which is mounted rotatable feed screw 14 driven from a power source (not shown). Downstream of chamber 12 is pressure chamber 15 into which heat-plastified material is delivered by the rotation of screw 14. At the remote end of device 11 is cylindrically shaped die plate means 16 having a plurality of radially extending orifice means 17 through which heat-plastified material is extruded due to the pressure built up in chamber 15 by the rotation of screw 14.

Attached to device 11 is cutter head 18 comprising cutter-housing 19, and cutter means 20 which has a cylindrical body 21 mounted for rotation about its longitudinal axis which is aligned with the axis of die plate means 16. Cutter means 20 also has a plurality of blades 22 projecting radially from and extending longitudinally along body 21 in helical fashion. Each of blades 22 has, on its free end 23, a cutting edge 24 which is operatively associated with the downstream face 25 of die plate means 16. That is to say, there is a very small clearance between edge 24 and face 25. As a consequence, heat-plastified material extruded through orifice means 17 in die plate means 16 is sheared or cut by edges 24 on the cutter means as the latter rotates. The resultant pellets 26 formed by the cutter operation have a diameter determined by the downstream size of orifice means 17, and a thickness or length dependent upon the speed of rotation of cutter means 20, and the pressure of the heat-plastified material in chamber 15.

Figure 5:
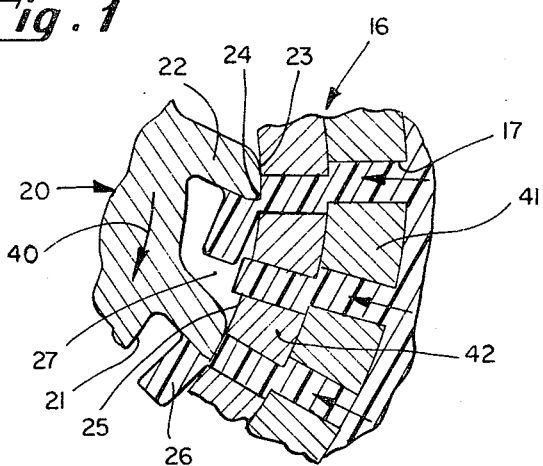
FIG. 5 is an enlarged view similar to the view in FIG. 4 showing the cutter in the process of shearing pellets.

As seen best in FIG. 5, adjacent pairs of blades 22 and the intervening portion of body 21 of the cutter means establish longitudinally extending channels 27 into which pellets 26 fall after being cut by edges 24 of the cutter means. Face 25 of the die plate means closes the longitudinally portion of channel 27 when the blades are adjacent orifice means 17 so that the channels are open only at axial ends 28 and 29 of body 21 of cutter means 20, as shown in FIG. 2.

As seen in FIG. 2, cutter means 20 is mounted on support shaft 30 which is cantilevered from electric motor 31 rigidly attached to end plate 32 which closes the axial end of housing 19 adjacent axial end 28 of the cutter means. Plate 32 is spaced from end 28 of the cutter means to establish inlet chamber 33 which is closed to ambient atmosphere by seal 34 mounted in plate 32 and surrounding shaft 30. Chamber 33 is pressurized through conduit 35 with treatment fluid which flows from end 28 to end 29 of the cutter means through channels 27 carrying the pellets, as they are sheared from face 25, away from cutting edges 24 of the blades and into receiver tube 36 attached to die plate means 16 adjacent end 29 of the cutter means. The treatment fluid in tube 36, laden with pellets, flows into chamber 37 in which the pellets are separated from the fluid. In a conventional manner, fluid may be recycled into chamber 33, and the pellets removed for further processing.

The flow of fluid in channels 27 is enhanced by the pumping action created by the rotation of cutter means 20 in the direction indicated by arrow 40. The helical nature of blades 22 causes them, when the cutter means is rotating, to act as a pump on the treatment fluid. That is to say, blades 22 appear to advance from axial end 28 to axial end 29, the same direction in which the flow of fluid occurs. Because the blades are helically arranged, rotation of the cutter means causes the cutting edge of a blade to traverse the face 25 of the die plate means along a generatrix thereof, in the same direction as the flow of fluid. Extruded material is severed sequentially, each pellet being flushed toward tube 36 immediately after the pellet is severed and before the cutting edge severs the next pellet.

Housing 19 is provided with an internal circulation chamber 38 within which conditioning fluid can be circulated by means of conduits 39. This arrangement permits the temperature of cutter-head 18 to be closely controlled during the face-cutting operation. In other words, the cutting head can be heated or cooled by providing suitable conditioning fluid to conduit 39.

The treatment fluid may be gas or liquid, depending upon the type of their plastic material being extruded. The inlet fluid can be heated to heat the pellets; or the fluid can be cooled to extract heat from the pellets, all depending upon the process involved. By providing a closed environment for the cutting operation, a reducing or inert gas can be used as the treatment fluid when the material being extruded is sensitive to oxidation. In addition, crumbs of material generated along with the pellets during the cutting process are withdrawn as they are generated, and shunted to a collection zone eliminating the problem of build-up on structural members adjacent the cutter means. More importantly, however, the closed environment permits the treatment fluid to be used to remove volatiles from the pellets. If the latter are dimensionally uniform, it is possible with this arrangement to insure that a predetermined amount of volatiles will be removed from each pellet thus permitting this arrangement to produce large masses of homogeneous pellets.

The use of a liquid treatment fluid, such as water, in conventional face cutting apparatus, usually requires special procedures during start-up and shut-down of the extruder means in order to keep the liquid from back-flowing through the orifices of the die plate means and into the pressure chamber where the feed-screw of the extruder operates. Such procedures usually involve a predetermined start-up and shut-down cycle of operation during which treatment fluid is cutoff from the cutter housing. In many instances, the denial of treatment fluid causes overheating of the cutter means and permits pellets to build up and clog the cutter means and various auxiliary apparatus parts. In addition, the pellet product produced during these cycles is not identical to the pellet product produced when the treatment fluid is present.

Figure 4:
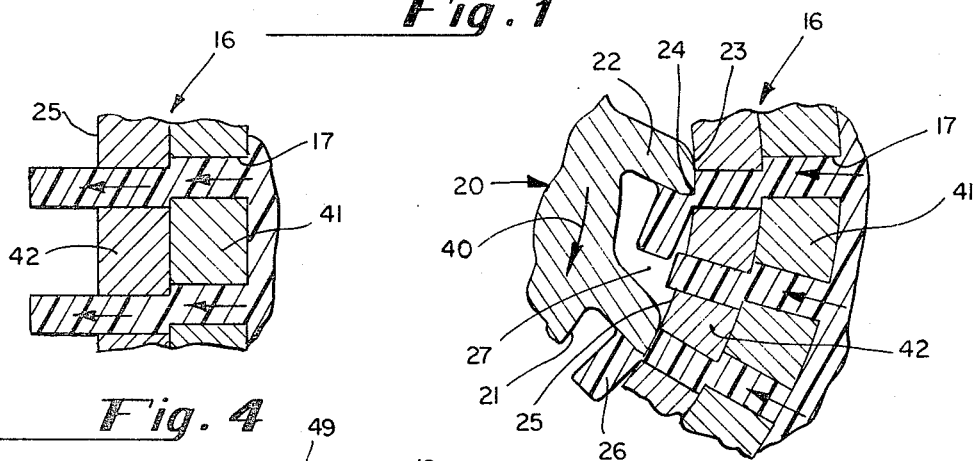
FIG. 4 is an enlarged view in section of the nested die plates showing the extrusion of heat-plastified material through the constriction at the interface between the two die plates.

These problems are solved by the novel die plate means disclosed herein. Specifically, die plate means 17 comprises a pair of nested die plates 41, 42 mounted for selective positioning relative to one another. Each pair of die plates has radially extending orifices which, in one relative position, are essentially aligned (FIGS. 1 and 2) for introducing a minimum constriction to the extrusion of heat-plastified material from downstream face 25 of the die plate means. The relative position of the die plates can be manually or automatically changed to alter the degree of misalignment of the orifices in the die plates as indicated by FIGS. 4 and 5. By totally misaligning the orifices in the two die plates, the cutting chamber containing the cutter means and the treatment fluid, can be disconnected from the pressure chamber containing the heat-plastified material. When the die plates have this relative position, the start-up and shut-down cycle is reduced to a negligible period of time. In addition, the treatment fluid can be used to flush-out the cutting chamber after shut-down of the feed screw 14 of the extruder in preparation for the next face-cutting operation.

In the preferred embodiment of the invention, upstream die plate 41 is formed as a part of outer tubular cylinder 43 which is rigidly secured to housing 19. Downstream die plate 42 is formed as a part of concentric inner tubular cylinder 44 which is dimensioned so as to be slideably movable in cylinder 43 both angularly and axially. Rigidly attached to one end 45 of inner cylinder 44 is receiver tube 36 as shown in FIG. 2. Tube 36, adjacent the end attached to cylinder 44, has limit shoulder 46 that projects outwardly beyond the periphery of inner tube 44 and can abut outer tube 43 to limit axial movement of the tube and inner cylinder in one direction. Intermediate the ends of tube 36 is annular pressure shoulder 47 which faces away from end 45 of cylinder 44. At the end of tube 36 most remote from end 45 is collar 48.

Extensions 49 on the axial end of housing 19 opposite to plate 32 and motor 31 provide support for collar 50 which is thus rigidly attached to the housing. The axis of collar 50 is aligned with the axis of rotation of cutter means 20 and receiver tube 36. Collar 50 has an inner surface 51 that forms a bearing for tube 36 supporting the latter for axial rotation and longitudinal sliding movement, and forms a fluid chamber 52 with shoulder 47 and the outer surface of tube 36. Suitable seals 53 and 45 on each side of chamber 52 are provided. Spring 55, captured between collar 48 on tube 36 and collar 50 on housing 19, urges shoulder 46 toward abutment with cylinder 43.

Figure 3:
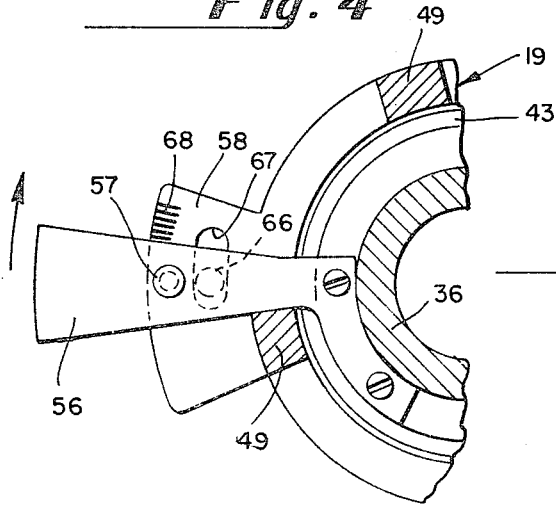
FIG. 3 shows manual means of imparting relative movement of one die plate relative to the other die plate of the die plate means, and is a view taken along the III—III in FIG. 2.

To hold the orifices in die plates 41 and 42 in a fully aligned position when shoulder 46 abuts cylinder 43, the angular position of inner cylinder 44 must be established. This is done by providing, on tube 36, radial arm 56 which projects between extensions 49, as shown in FIG. 3, and is provided with removable pin 57 slideably received in a suitable hole in flange 58 forming a part of housing 19.

When the orifices are fully aligned as indicated above, there is minimum restriction applied to the extrusion of heat-plastified material. If the viscosity of the material in chamber 15 begins to decrease, due to an increase in temperature of the extrusion chamber, for example, the pressure of the heat-plastified material in the chamber will tend to decrease as the rate of extrusion begins to increase. Without compensation, the pellet size would also increase.

Compensation is provided for by control means 59 which is responsive to changes in pressure in chamber 15 for axially moving inner cylinder 44 sufficiently to change the constriction to the flow of heat-plastified material out of chamber 15 as caused by the misalignment of the orifices in plates 41, 42. Such misalignment is changed by control means 59 in such a way as to oppose changes in pressure in chamber 15. In this way, the pressure in chamber 15 can be maintained substantially constant despite changes in visosity of the heat-plastified material.

The pressures in chamber 15 sensed by pressure transducer 60 which produces a signal proportional to the pressure in the chamber. Receiver 61 converts the signal into a control for regulator 62 whose output is applied to pneumatic valve 63 which controls air pressure supplied to accumulator 64 in a manner directly related to the pressure in chamber 15. That is to say, a decrease in pressure in chamber 15 is accompanied by a decrease in air pressure in the accumulator, for example.

The hydraulic fluid in accumulator 64 is applied via line 65 to fluid chamber 52. Thus, in the above example, a reduction in the air pressure applied to accumulator 64 results in movement of the piston in the accumulator to decrease the volume of hydraulic fluid in chamber 52. Such decrease permits spring 55 to move tube 36 axially (downwardly, as seen in FIG. 2). The resultant misalignment of the orifices in plates 41, 42 introduces a constriction at the interface between the plates as seen in FIG. 4. Such constriction will reduce the rate of extrusion and return the pressure in chamber 15 to its original value as determined by the manual setting of valve 63. In this manner, substantially constant pressure is automatically maintained in chamber 15.

Axial positioning of inner cylinder 44 relative to outer cylinder 43 is not the only way to control misalignment of the die plate orifices. Manual control can be exerted by manual rotation of cylinder 44. This mode of operation is carried out by withdrawing pin 57 from its mating hole in flange 58, and then manually rotating arm 56. Rod 66 rigidly attached to arm 56 projects through slotted hole 67 in flange 58 to permit limited angular movement of cylinder 44 to take place. Suitable indicia 68 is provided on flange 58 to permit visual determination of the degree of radial misalignment. Similarly, indicia 69 on one of the extensions 49 permits arm 56 to serve as a pointer to provide a visual read-out of the degree of axial misalignment. Having the ability to make manual adjustments is important because this mode of operation provides back-up control in the event the automatic control means becomes inoperative. In addition, manual adjustment permits chamber 15 to be selectively connected to the cutting chamber and facilitates start-up and shut-down procedures.

As seen in FIG. 4, the construction to the flow of heat-plastified material introduced by the misaligned orifices of plates 41, 42 occurs at the interface therebetween, intermediate the upstream entrance to the orifices and the downstream exit. Consequently, the cross-sectional size of the extrusion is not changed as the constriction is manually or automatically changed to maintain the desired extruder pressure. Pellet size is therefore not affected by the controls.

Figure 7:
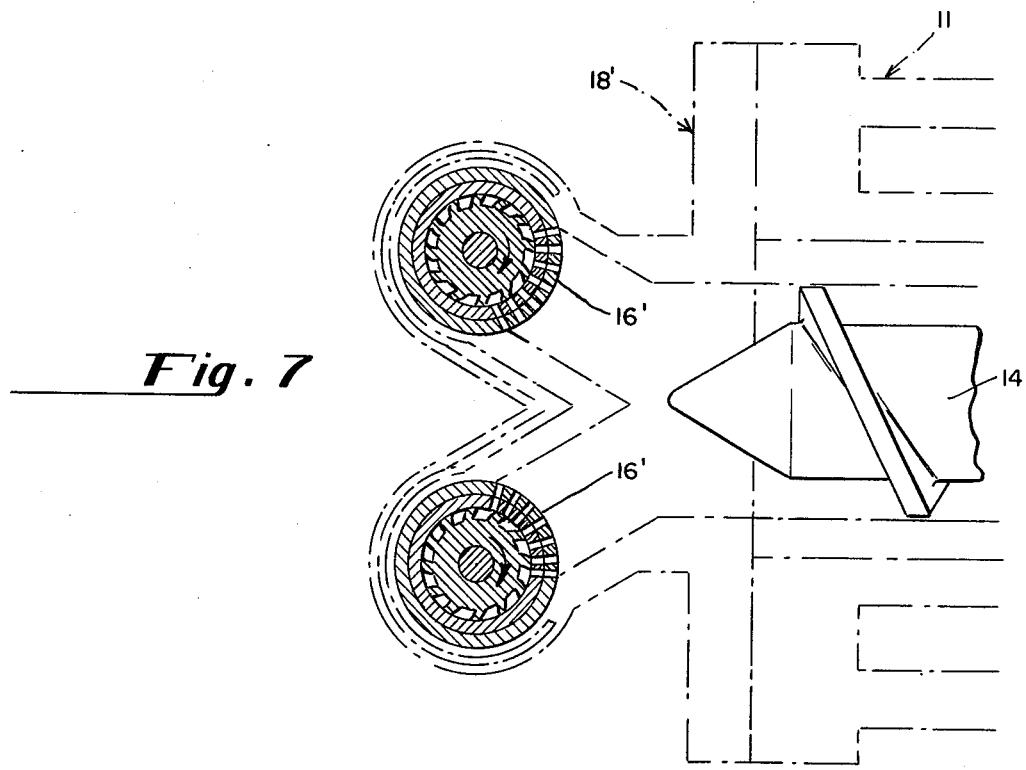
FIG. 7 is a schematic showing of dual face-cutting apparatus having an adjustable die arrangement made in accordance with the present invention.

Production volume is increased by making use of the duplex face-cutters shown in FIG. 7. Here, feed screw 14 supplies two die plate means 16', 16' in parallel. These die plate means are a part of modified cutter head 18'; and each is associated with its own cutter means.

Figure 6:
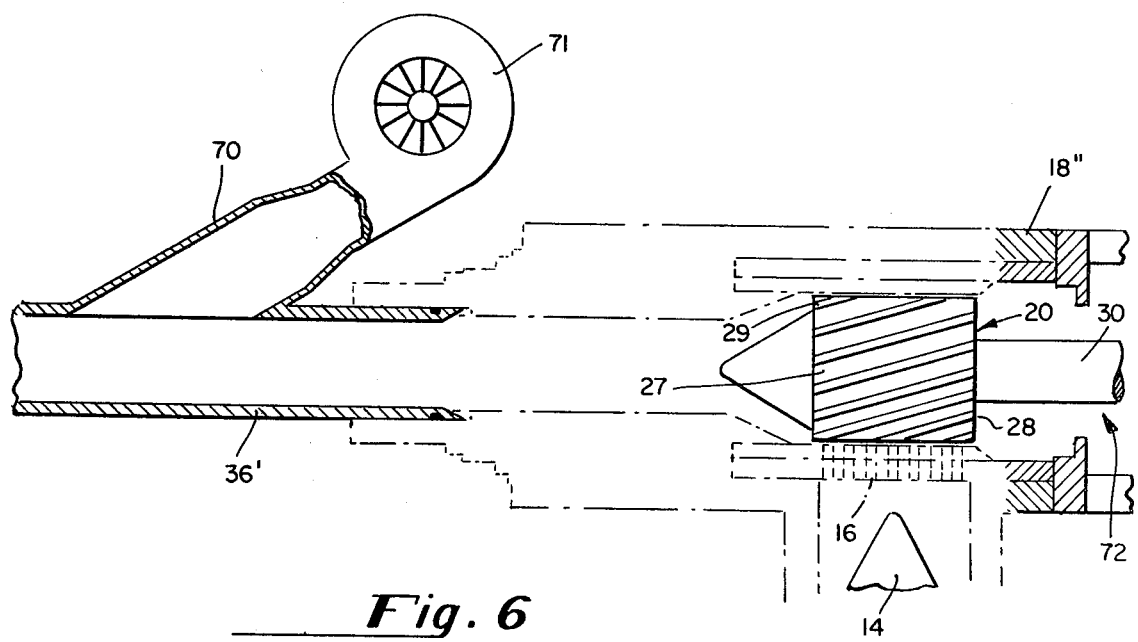
FIG. 6 is a schematic showing of a modified enclosure system for the cutter in which air is used as the pellet-treating fluid.

A modified cutter head 18'' is shown in FIG. 6. Head 18'' lacks shaft seal 34 of head 18. As a consequence, face 28 of cutter means 20 is exposed to ambient atmosphere. In this modification, the receiver tube 36° is provided with a Y-shaped extension 70 inclined with respect to the axis of the tube. Air blower 71 exhausts into extension 70 aspirating air through opening 72 that provides clearance for shaft 30. Thus, ambient air is made to serve as the treatment fluid as it flows through channels 27 of cutter means 20 aided by the pumping action of the cutter blades.

What is claimed is:

1. In a face-cutting apparatus for making pellets of thermoplastic material comprising an extrusion device, the discharge end of which terminates in a die means, said die means comprising a pair of concentric plates each with a plurality of extrudate-passing orifice holes extending therethrough, at least one plate being rotatably mounted with respect to the other, with the upstream-most or first plate comprising at least a portion of a generally cylindrical configuration, and presenting a convex surface in an upstream direction, with the downstream-most or second plate being generally cylindrical in configuration and being coaxial with the upstream-most plate and in mating nested engagement with a generally concave surface thereof, with said orifice holes in the plates being arranged and spaced similarly for precise alignment therebetween, the improvement which comprises a mounting for said second plate for selective infinitely variable movement relative to said first plate through a narrow range sufficient to vary the orifice openings defined by misaligned counterpart holes in the plates.

2. The apparatus of claim 1, wherein said second plate is mounted for rotatable movement through an arcuate range.

3. The apparatus of claim 1, wherein said second plate is mounted for axial movement through a linear range.

4. The apparatus of claim 1, wherein the limits of said range are substantially complete alignment of holes in the plates such that the orifices defined by holes in both plates are completely open on the one hand and substantially complete misalignment of holes in the plates, such that the orifices defined by the holes in both plates are completely closed on the other.

5. The apparatus of claim 4, including adjusting means connected to said second plate for selectively changing the relative positions of the die plates.

6. The apparatus of claim 5, wherein said second plate is mounted for rotatable movement through an arcuate range, wherein said adjusting means comprises a lever means attached to said second plate, said lever means having a manually engageable portion for manually changing the angular position of said second plate whereby the constriction produced in the orifices of said plates can be manually adjusted.

7. The apparatus of claim 6, including indicia means associated with said level means for indicating the degree of adjustment of said orifices.

8. The apparatus of claim 5, including means operatively connecting said adjusting means and the interior of said extrusion device for adjusting the relative positions of said first and second plates in response to pressure of the heat-plastified material, immediately upstream of said die means, for automatically changing the relative positions of the plates to maintain substantially constant pressure within said extruder device.

9. The apparatus of claim 8, wherein said second plate is mounted for axial movement through a linear range.

* * * * *